(12) United States Patent
Fleck et al.

(10) Patent No.: US 7,815,034 B2
(45) Date of Patent: Oct. 19, 2010

(54) DEVICE FOR GROUPING INDIVIDUALLY PACKAGED GOODS

(75) Inventors: Norbert Fleck, Palling (DE); Bernhard Schmid, Neubeuren (DE)

(73) Assignee: Krones AG, Neutraubling (DE)

( * ) Notice: Subject to any disclaimer, the term of this patent is extended or adjusted under 35 U.S.C. 154(b) by 137 days.

(21) Appl. No.: 11/661,615

(22) PCT Filed: Aug. 26, 2005

(86) PCT No.: PCT/EP2005/009214

§ 371 (c)(1),
(2), (4) Date: May 29, 2007

(87) PCT Pub. No.: WO2006/024460

PCT Pub. Date: Mar. 9, 2006

(65) Prior Publication Data

US 2008/0099307 A1    May 1, 2008

(30) Foreign Application Priority Data

Sep. 2, 2004    (DE) .................. 10 2004 042 474

(51) Int. Cl.
*B65G 47/26* (2006.01)
*B65G 25/00* (2006.01)
*B65G 47/28* (2006.01)

(52) U.S. Cl. ............... 198/437; 198/418.7; 198/419.3; 198/430; 198/431; 198/459.8

(58) Field of Classification Search ......... 198/418.7, 198/419.3, 430, 431, 459.8

See application file for complete search history.

(56) References Cited

U.S. PATENT DOCUMENTS

| | | | |
|---|---|---|---|
| 3,778,959 A * | 12/1973 | Langen et al. | 53/543 |
| 4,316,534 A * | 2/1982 | Cummins | 198/345.3 |
| 4,625,499 A | 12/1986 | Yamaguchi et al. | |
| 5,065,856 A * | 11/1991 | Reid et al. | 198/419.3 |
| 5,074,744 A | 12/1991 | Mastak | |
| 6,102,190 A * | 8/2000 | Haas et al. | 198/633 |

(Continued)

FOREIGN PATENT DOCUMENTS

DE    30 29 508 C2    3/1982

(Continued)

OTHER PUBLICATIONS

Written Opinion for PCT/EP2005/009214 mailed May 3, 2007.

(Continued)

*Primary Examiner*—Gene Crawford
*Assistant Examiner*—Yolanda Cumbess
(74) *Attorney, Agent, or Firm*—Marshall, Gerstein & Borun LLP

(57) ABSTRACT

A device for grouping individually packaged goods which are fed in a substantially closed stream by the means of conveyance along a transport plane, and grouped by at least one divider finger which can be introduced from below transversely to the transport plane into the stream along the conveyance direction, where, for the at least one divider finger, a motor drive provided which is capable of carrying out in a free and adjustable manner a movement of the at least one divider finger transversely to the transport plane (z-direction) independently of the movement along the conveyance direction (y-direction) and vise versa.

19 Claims, 2 Drawing Sheets

U.S. PATENT DOCUMENTS

| | | |
|---|---|---|
| 6,321,896 B1 * | 11/2001 | Zuccheri et al. .......... 198/419.1 |
| 2003/0098219 A1 | 5/2003 | Mader et al. |
| 2003/0136641 A1 | 7/2003 | Iwasa et al. |

FOREIGN PATENT DOCUMENTS

| | | |
|---|---|---|
| DE | 31 44 449 A1 | 8/1982 |
| DE | 40 36 341 A1 | 5/1992 |
| DE | 698 03 456 T2 | 9/2002 |
| EP | 0 906 235 B1 | 1/2004 |
| GB | 2090804 A * | 7/1982 |
| JP | 49-15597 | 2/1974 |
| JP | 03-115015 A | 5/1991 |
| JP | 3115015 | 5/1991 |
| JP | 10-181714 A | 7/1998 |
| JP | 10181714 | 7/1998 |
| JP | 2001-080736 A | 3/2001 |
| JP | 2001080736 | 3/2001 |
| NL | 285061 | 1/1965 |

OTHER PUBLICATIONS

Chinese Office Action for Application No. 200580029587.8, dated Apr. 15, 2010.

* cited by examiner

DEVICE FOR GROUPING INDIVIDUALLY PACKAGED GOODS

CROSS-REFERENCE TO RELATED APPLICATION

This is the U.S. national stage under 35 U.S.C.§371, of international application no. PCT/EP2005/009214, having an international filing date of Aug. 26, 2005, and claims priority to German application no. 10 2004 042 474.8 filed on Sep. 2, 2004.

FIELD OF THE DISCLOSURE

The disclosure relates to a device for grouping individual packaged goods, having a divider for other movable structure to segregate groups of goods from the remainder of the goods.

BACKGROUND OF THE DISCLOSURE

Such grouping devices are used primarily in production installations for mass producing individually packaged goods. During the transport between the processing machines, the goods are in a more or less closed product stream. Depending on the capacity and the structure of the processing machine, the stream must be subdivided into partial groups of different size. Such a subdivision is required in the food industry, particularly in the beverage industry, among other sectors. In the food industry, the product stream of beverage containers, such as, for example, bottles or cans, is grouped by a packaging machine to produce ready-for-sale packing units.

In the state of the art, different grouping devices for several more or less closed product streams exist already. Thus, for example, the German Patent DE 3144449 A1 shows a grouping device, whose crossbars, which present divider fingers, engage from below in the closed product stream, to create gaps in it, as a result of the different speeds of the conveyor belt and the crossbars, and thus they divide the stream into groups. The crossbars here run in a closed circulation path, which is in a plane that is vertical to the transport plane. The drawback of this invention is that it does not allow a rapid resetting of the size of the grouping units. If such a grouping is to be carried out, the machine must be stopped, and mechanical settings and adjustments have to be made.

The German Patent DE 4036341 A1 relates to a grouping device for separating container groups from a container stream. The grouping elements, which are attached to a perpetually circulating drive element, are provided with abutment and retention surfaces. Although the grouping elements can be adjusted in such a manner that they can be adapted to different container diameters, this device does not allow the arbitrary determination of the number of containers in a grouped unit.

The German Patent DE 3029508 C2 discloses a device for grouping work pieces in which spokes, to which the dividers are attached, are attached to a common shaft. As a result of the up and down movement of the shaft, and the associated change in the separation between the shaft and the transport plane, the length of the collection to be separated can be set. However, resetting the length of the rows of individually packaged goods to be separated is rather complicated, because one needs to change not only the separation between the shaft and the transport plane, but also the length of the circulation guides. In practice, it is therefore difficult to achieve a flexible design of the collection lengths within a time of a few rotations.

SUMMARY OF THE DISCLOSURE

Therefore, the problem of the disclosure is to make available devices for grouping objects, which allow the changing or setting of a number of objects in a unit to be grouped, in a simple, flexible and advantageous manner.

In addition, the flexibility should be optimized so that, on the same machine, a great variety of objects can be grouped at low expense, using, most advantageously, selectable separations.

The individually packaged item to be grouped can in principle be any unit of groupable individually packaged goods. The items preferably are containers that present a standing surface, such as, bottles or cans, and contain, for example, foods, cleaning agents, drugs, or similar products. They can also be other containers that present a standing surface, such as, for example, canisters, cartons or similar items. The delivery of the individually packaged item to the grouping station occurs in a substantially closed stream. Thus, it does not matter whether the objects are in contact or separated by small separations. The means of conveyance, on which the individually packaged goods are transported, can be belts, chains or similar devices. It is also conceivable for the objects to be placed on work piece carriers (slaves) when they are moved into the grouping station. The transport system used must ensure that there are recesses in the transport surface, through which the transport fingers can penetrate and thus engage with the individually packaged item.

The divider finger can be of various shapes. It is conceivable for the at least one divider finger to present a flat or a round cross section. It is also possible for the shape of the divider finger to adapt to the shape of the objects to be grouped. However, at the time of the change of the objects to be grouped, a replacement of a format part has to be carried out on the divider bars and/or the divider fingers. The divider finger(s) is (are) on a divider bar which moves in a closed circulation path during a grouping process. The circumferential plane is here vertical to the transport plane. One component of the movement in the conveyance direction of the container represents a movement in the y-direction. On the other hand, if there is a movement in the z-direction, the movement of the divider fingers and/or the divider bar is in a certain direction, i.e. transverse or vertical to the transport plane.

The entire circulation of the divider fingers and the divider bar in a grouping process can be decomposed into components of movement in the y-direction and the z-direction. The movement of the at least one divider finger in the y-direction and of the at least one divider finger in the z-direction is not the result of forced coupling, rather it can be carried out by a controlled superposition of two movements, and can thus independently of each other. Nevertheless, they follow a preset route (path) to ensure the reproducibility of the grouping process.

The different movement courses (paths, velocity profiles), for different containers or for a differentiated number of containers, are entered and stored in the program memories of a control device, possibly by data entry. The fact that the components of movement in the y-direction and in the z-direction can be adjusted independently of each other and freely means that the movements of the divider bar and of the divider fingers can be adjusted optimally with respect to the containers to be moved. For example, if containers are grouped that are very tall, then only the movement component of the divider fingers in the z-direction has to be increased, so that they protrude further out of the transport plane to prevent the tipping over of the containers, without changing the movement component of the divider bar in the y-direction. Furthermore, it is possible, for example, to generate different separations or collection lengths that recur cyclically.

A control device can be, for example, in the form of a commercial PC, or PC for industry. However, it is also possible for the control device to be a programmable logic control or PLC. It has at least one program memory, in which data, values and programs can be stored. Data and values can be, for example, parameters that determine the movement course, such as, for example, the acceleration of the at least one divider bar and/or divider fingers. Other fixed values can be the height, the diameter, or similar information on the individually packaged item, from which certain movement courses or movement data can be determined. For example, if the individually packaged item heights are large, the divider fingers can protrude further out of the transport plane, to prevent tipping over, or the acceleration of the divider bar can be reduced during the movement of the individually packaged item in the y-direction. Different programs can also be stored in the program memory, which determine, for example, the movement courses of the divider bar. Thus, with a grouping device for individually packaged goods according to the invention, it is feasible to separate groups of individually packaged goods, which groups are not always of the same shape, from a stream of individually packaged goods. This can be necessary, for example, if the device for grouping individually packaged goods is located before a palletizing unit or a packaging machine, and layers of individually packaged goods with different layer patterns must be produced.

In a preferred embodiment, there are two divider bars, each with at least one divider finger. The presence of two divider bars ensures that, at all times, at least one divider bar is in engagement with the containers. The other one can change its position temporarily, and then be returned again into the starting position before the next grouping process. In another preferred embodiment variant, each individually packaged piece is guided by two divider fingers. Thus, a centering and a reliable bracing of the individually packaged item are ensured during the grouping.

If more than one divider bar is present, then the movements in the transport direction can be adjusted independently of each other. This means, for example, that an increase in the speed of one divider line does not necessarily entail an increase in the speed of the other divider bar. The result is that the separations between the divider bars do not always have to be constant. However, this also means that it is possible to design grouping processes variably, in such a way that, for example, two times four containers and then one times three containers are grouped. The number of rows per group thus does not have to be the same.

In a preferred embodiment variant, the divider bars present each have at least one drive unit which is specific to them, particularly a motor drive unit, to effect the movement in the y-direction. The at least one divider finger is, or several divider fingers per divider bar, which are connected mechanically to each other, are connected to a drive unit which carries out the movement in the z-direction. In another variant, each divider finger on each divider bar has its own drive unit to carry out the movement in the z-direction. As a result, the divider fingers of one divider bar can protrude to varying degrees into the transport plane. The drive units can be motors, such as servomotors or linear motors, and also pneumatic or hydraulic components, such as, pneumatic or hydraulic cylinders, or non-electric servodrives such as pneumatic linear servodrives. It is also conceivable to use direct drives.

In addition, the independently executable movements of the divider bars and/or divider fingers in the x-direction and in the y-direction can be carried out by parallel kinematics or bent lever mechanisms.

In another cost advantageous embodiment, it is conceivable for certain components of the movements to be carried out by the cylinder being moved into end positions. For example, if one does not want to use expensive motor drive units for the movement of the divider bars or divider fingers in the z-direction, the cylinders can also be incorporated, and be moved into their starting and end positions, to implement' the switching positions "divider fingers not in engagement with the stream of individually packaged goods" and "divider fingers in engagement with the stream of individually packaged goods."

In addition, it is possible to provide each motor with its own control or regulation unit to ensure the correct implementation of the components of the movement in the y-direction and in the z-direction. In this case, the individual control or regulation units can be connected, via a communication system, such as, for example, a wired bus system or a wireless transmission system, to each other and/or to a central unit which can remove certain movement courses from the program memory and then transmit them to the individual control and regulation units.

In a preferred embodiment variant, the movement of the divider bars in the y-direction and the movement of the divider in the z-direction occur along threaded spindles. However, sliding or magnetic bars can also be used. Furthermore, it is conceivable to use guides with associated force transmission elements, such as, toothed belts, chains or similar items.

A preferred embodiment of the invention consists in generating movement of the divider fingers in the z-direction by the movement of the divider bars in the z-direction. Thus, the divider fingers are mounted in a fixed manner to the divider bars, and the movement of the divider fingers occurs indirectly by the movement of the divider bars.

In another embodiment, the divider bar does not change its position during the movement of the divider fingers in the z-direction. Thus, the divider fingers can be moved from or into the divider bar, or, seen in the z-direction, they are arranged above the divider bar.

After the completion of the grouping process, the divider fingers are moved downward out of the transport plane and thus they are no longer in engagement with the individually packaged goods. This divider bar now moves against the transport direction of the containers, to be brought again in engagement with the individually packaged goods. For this purpose, the divider bar moves below the other divider bar, which is now in engagement with the individually packaged item. After it has completed the movement against the direction of movement of the containers, then, after a reversal of movement, the divider fingers are moved again into the transport plane, and brought in engagement with the individually packaged goods.

In a preferred variant of the invention, the speed of advance of the at least one divider bar in the engagement position is smaller than the speed of advance of the means of conveyance. This means that the divider fingers function as retention surfaces for the individually packaged goods. In another embodiment variant of the invention, the speed of the at least one divider bar in the transport direction is higher than the speed of advance of the means of conveyance. In this case, seen in the transport direction, the divider fingers must be brought in engagement with the group of individually packaged goods which is to be subdivided, behind it, in order to "push" the group at an accelerated speed with slippage over the means of conveyance.

BRIEF DESCRIPTION OF THE DRAWINGS

Below, the preferred embodiment is explained in greater detail with reference to the drawing. In the drawing.

DETAILED DESCRIPTION OF THE DISCLOSURE

Figure 1:
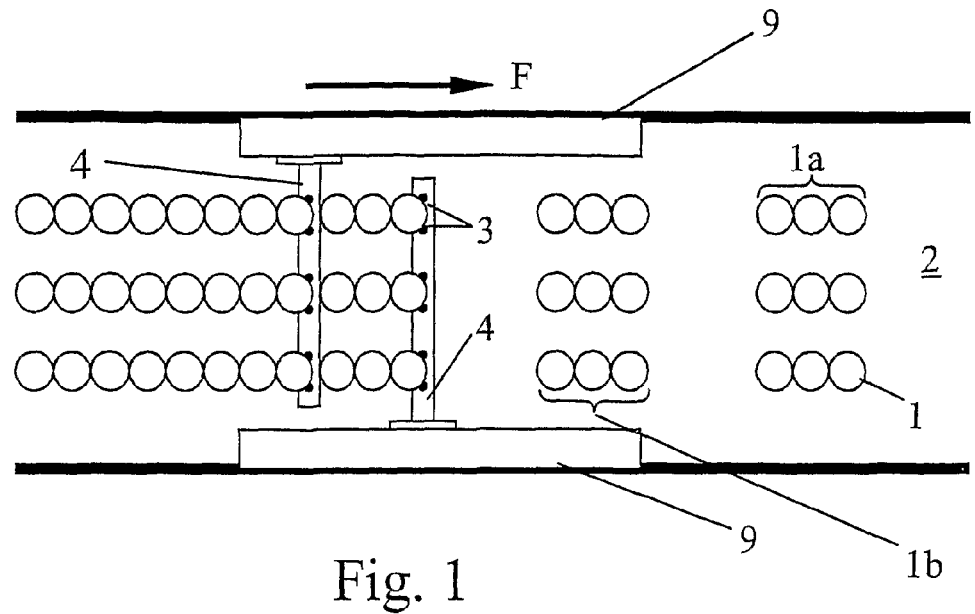
FIG. 1 shows a schematic top view of a device according to the disclosure.

FIG. 1 shows already grouped individually packaged goods 1, such as, for example, cans which are still in the stream of individually packaged goods. They are transported in the upright position, in several rows, on a means of conveyance 2, with frictional grip in the conveyance direction F, which forms the transport plane. For the grouping, divider fingers 3 are available, located on divider bars 4. They can be brought into engagement from below with the individually packaged items 1 through the transport plane. The means of conveyance 2 consists, for example, of several conveyer belts that run parallel to each other and are separated by lateral separations, resulting in free penetration with grip for the divider fingers 3. In the present case, the grouping device has two independent groups of divider fingers 3, which are arranged on two divider bars 4, which are not connected mechanically to each other. To allow a better differentiation, these components are marked with the reference numerals 3a, 3b, and 4a and 4b, respectively, in the sequence of FIGS. 3a-3c. The divider bars 4, on the other hand, are designed as cantilevers that run parallel to the transport plane, and are attached in each case to their own vertical mechanical stage 9, laterally outside and under the means of conveyance 2.

Figure 2:
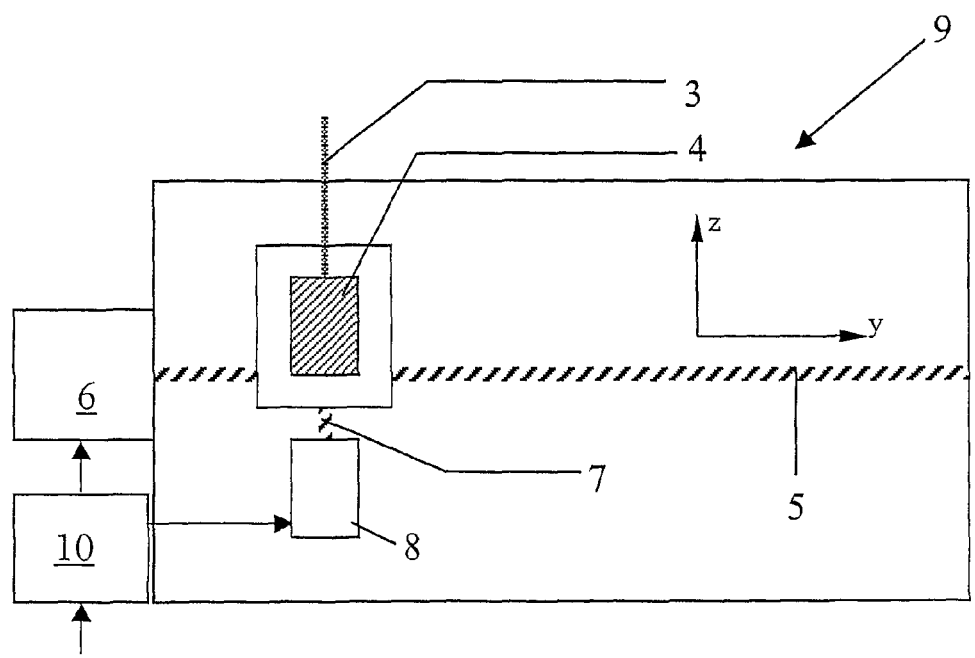
FIG. 2 shows a side view of the divider fingers and of the divider bar of the device according to FIG. 1, and FIGS. 3a-3c show a complete grouping cycle in a side view.

FIG. 2 shows a mechanical stage 9 in a side view, which moves the divider bars 4 and thus the divider finger 3 in the z-direction and in the y-direction, where the y-direction corresponds to the conveyance direction F, and the z-direction is oriented perpendicularly to the transport plane. Each divider bar 4 has its own motor drive unit 6 for the movement in the y-direction, and a motor drive unit 8 for the movement in the z-direction. The drive unit 6, 8 are preferably electrical servomotors. By actuating the drives 6 and 8, the divider bar 4—and thus also the divider fingers 3 attached to them—are moved along the threaded spindles 5 and 7 in the y-direction and/or the z-direction. The actuation of the motor 6 is responsible for the movement of the divider bar 4 along the threaded spindle 5, while the actuation of the motor 8 is responsible for the movement of the divider bar 4 and thus also the divider finger 3 along the threaded spindle 7. The motor 6 is here rigidly attached to a framework, while the motor 8 can be moved along the y axis by the threaded spindle 5. To simplify the representation, the figure does not show a guide which receives the forces occurring during the movement of the divider bars along the threaded spindles, thus holding it. On this described guide, an additional guide (not included in the drawing) slides in the y-direction, thus holding the divider bar 4 during the movement in the z-direction.

The two motors 6 and 8 are in connection with the control device 10. In contrast to the representation, the direction can be bidirectional, so that signals can also be transmitted from the motor 6, 8 to the control device 10. The control device 10 can thus be designed, for example, as a commercial PC or as a PC for industry. However, it is also possible for the control device 10 to be a special programming device (servocontrol) or a conventional PLC [programmable logic control]. From this servodevice 10, the two motors 6 and 8 receive signals concerning the movement they are to perform, such as, for example, process paths, and speed and/or acceleration values in the y-direction and in the z-direction. As a result of the superposition of the movements along the two axes, variable paths and speed profiles can be achieved, and optionally stored ahead of time for each type of individually packaged goods; if there is a switch of type, they merely need to be retrieved. Thus, no mechanical adjustment work needs to be carried out. Furthermore, this allows the easy performance of needed irregular grouping processes during operation, that is processes which require different separations for successive groups of individually packaged goods.

The divider rings 3 are substantially rigid in design. In the embodiment according to FIG. 2, they are mechanically connected to the sides of the divider bars 4 that are turned toward the transport plane. The movement of the divider fingers 3 in the z-direction thus occurs as a result of the movement of the divider bars 4 in the z-direction.

Figure 3A:
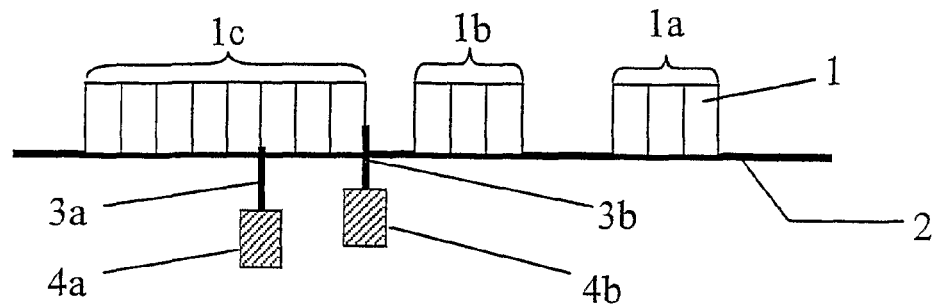
Figure 3B:
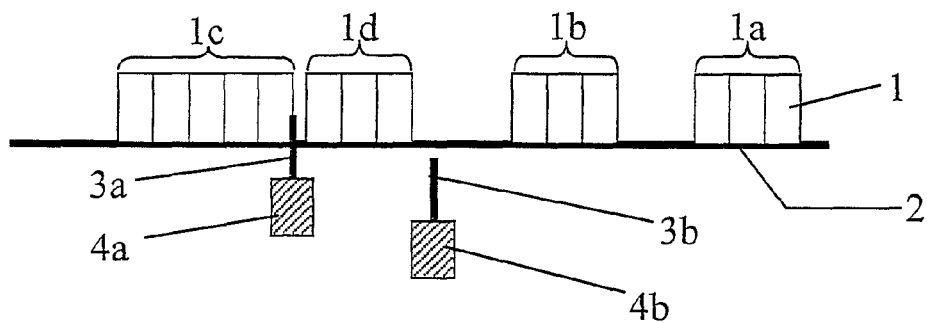
Figure 3C:
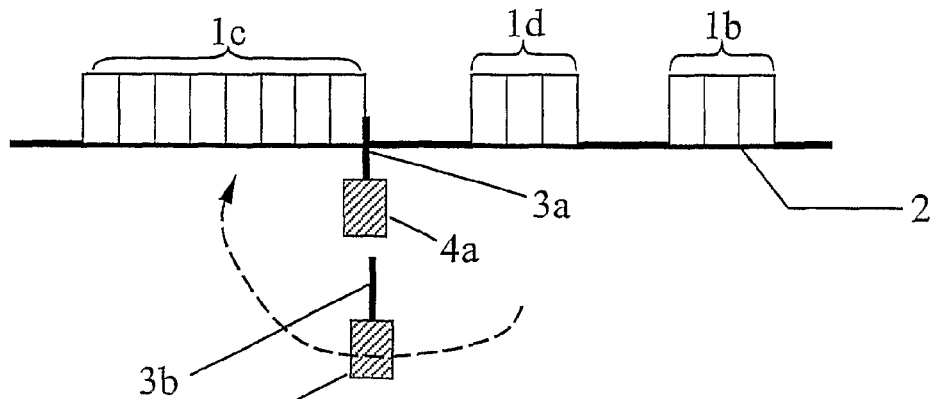

FIGS. 3a to 3c show a complete grouping process of individually packaged goods 1.

The divider fingers 3a on the divider bar 4a are just being brought in engagement from below with a substantially closed individually packaged goods stream 1c. The divider fingers 3b of the divider bar 4b, which precedes by the length of one group of individually subdivided goods in the conveyance direction F, are always in engagement with individually packaged items 1. In this phase, the divider bars move more slowly than the means of conveyance 2, that is the individually packaged item in the individually packaged goods stream 1c is pushed into the preceding divider fingers. As a result of the difference between the speeds of the means of conveyance 2 and the divider bar 4b, the already separated individually packaged goods groups 1a and 1b move more rapidly than the individually packaged goods stream 1c which is still slowed by the divider fingers. As a result, the depicted separations are produced between the individually packaged goods groups 1a and 1b, which are already separated from the substantially closed individually packaged goods stream 1c. These separations when added correspond to the length of the individually packaged good groups, for example, the partition measure of a subsequent packaging machine—not shown—which wraps the individually packaged good groups into sections of film or cardboard. If the separation of the individually packaged goods group 1b, after the desired separation from the individually packaged goods stream 1c has been reached completely, is insufficient, then the divider bar 4b is moved out downwards during an optional, brief, accelerated advance movement on the transport plane, as can be seen in FIG. 3b. In the meantime, the divider finger 3a has been moved entirely into the individually packaged goods stream 1c which results in the difference between the speeds of the means of conveyance 2 and the divider bar 4a starting to separate a new individually packaged goods group 1d at the preceding end from the substantially closed individually packaged goods stream 1c.

To be able to carry out another grouping of the individually packaged goods stream 1c, the divider bar 4b with the divider fingers 3b moves against the conveyance direction F of the container under the divider bar 4a back into its starting position, in which the divider bar 4a with the divider fingers 3a was in FIG. 3a. From there, after a reversal of movement, the divider fingers 3b can now again be brought in engagement with the substantially closed individually packaged goods stream 1c. As a result of this continually repeated work process, the substantially closed individually packaged goods stream 1c can be divided into individually packaged goods groups.

The invention claimed is:

1. Device for grouping individually packaged goods which are fed in a substantially closed stream on a means of conveyance in a conveyance direction along a transport plane, comprising at least one divider finger for grouping the packaged goods, the at least one divider finger being introduced from below to protrude out of the transport plane into the stream along the conveyance direction, and drive means provided for the at least one divider finger to carry out freely and in an adjustable manner, a movement of the at least one divider finger transversely to the transport plane in a z-direction independently of a movement in a y-direction along the conveyance direction, and vice versa, wherein the device comprises at least two independent groups of divider fingers which are not connected mechanically to each other, two divider bars are present, each with at least one divider finger, the movement in the y and z-direction is carried out by threaded spindles, and each divider finger on each divider bar has its own drive unit.

2. Device according to claim 1, wherein the drive means are in connection with a control device which coordinates the movement of the drive means according to at least one of predetermined circulation paths and speed profiles for the at least one divider finger.

3. Device according to claim 2, wherein the control device is a control with programmable memory.

4. Device according to claims 1 or 2, wherein the movement of the one divider bar in the conveyance direction can be adjusted independently and freely by the movement of the other divider bar in the conveyance direction.

5. Device according to claim 4, wherein the separations between the divider bars are freely selectable and adjustable.

6. Device according to claim 4, wherein the divider bar which has been brought out of the transport plane under the other divider bar and against the conveyance direction of the individually packaged goods into a starting position, from which that divider bar which has been moved out of the transport plane can be moved in into the transport plane for the purpose of grouping.

7. Device according to claim 4, wherein the speed of the at least one divider bar in the conveyance direction is lower than an advance speed of the transport means.

8. Device according to claim 4, wherein the speed of the at least one divider bar in the conveyance direction is higher than an advance speed of the transport means.

9. Device according to claim 4, wherein the at least one divider bar is designed as a cantilever.

10. Device according to claim 9, wherein the cantilever is attached to a mechanical stage laterally outside the transport plane.

11. Device according to claim 9, wherein the cantilevers are attached under the transport plane.

12. Device according to claims 1 or 2, wherein each divider bar and also each of the at least one divider finger associated with each divider bar are each associated with the motor drive means for carrying out the movement in the y and z-direction.

13. Device according to claim 12, wherein the motor drive means are servomotors.

14. Device according to claim 12, wherein the motor drive means are linear motors.

15. Device according to claim 1, wherein during the grouping process, each individually packaged item is moved by two divider fingers.

16. Device according to claim 1, wherein the individually packaged goods are one of bottles, cans, and similar containers for storing foods.

17. Device according to claims 1 or 2, wherein the movement of the at least one divider finger in the z-direction is caused by a movement of the divider bar.

18. Device according to claims 1 or 2, wherein the movement of the at least one divider finger in the z-direction is caused by a movement of the same out of or into the divider bar.

19. Device according to claims 1 or 2, wherein the divider bar with the at least one divider finger is moved downward out of the transport plane after the grouping process.

* * * * *

UNITED STATES PATENT AND TRADEMARK OFFICE
CERTIFICATE OF CORRECTION

PATENT NO. : 7,815,034 B2
APPLICATION NO. : 11/661615
DATED : October 19, 2010
INVENTOR(S) : Norbert Fleck et al.

Page 1 of 1

It is certified that error appears in the above-identified patent and that said Letters Patent is hereby corrected as shown below:

On the Cover Page:

Item (30), "10 2004 042 474" should be -- 10 2004 042 474.8 --.

Item (57), line 11, "vise" should be -- vice --.

Signed and Sealed this
Seventeenth Day of May, 2011

David J. Kappos
*Director of the United States Patent and Trademark Office*